L. GODDU.
PEGGING-MACHINE.
No. 171,609. Patented Dec. 28, 1875.
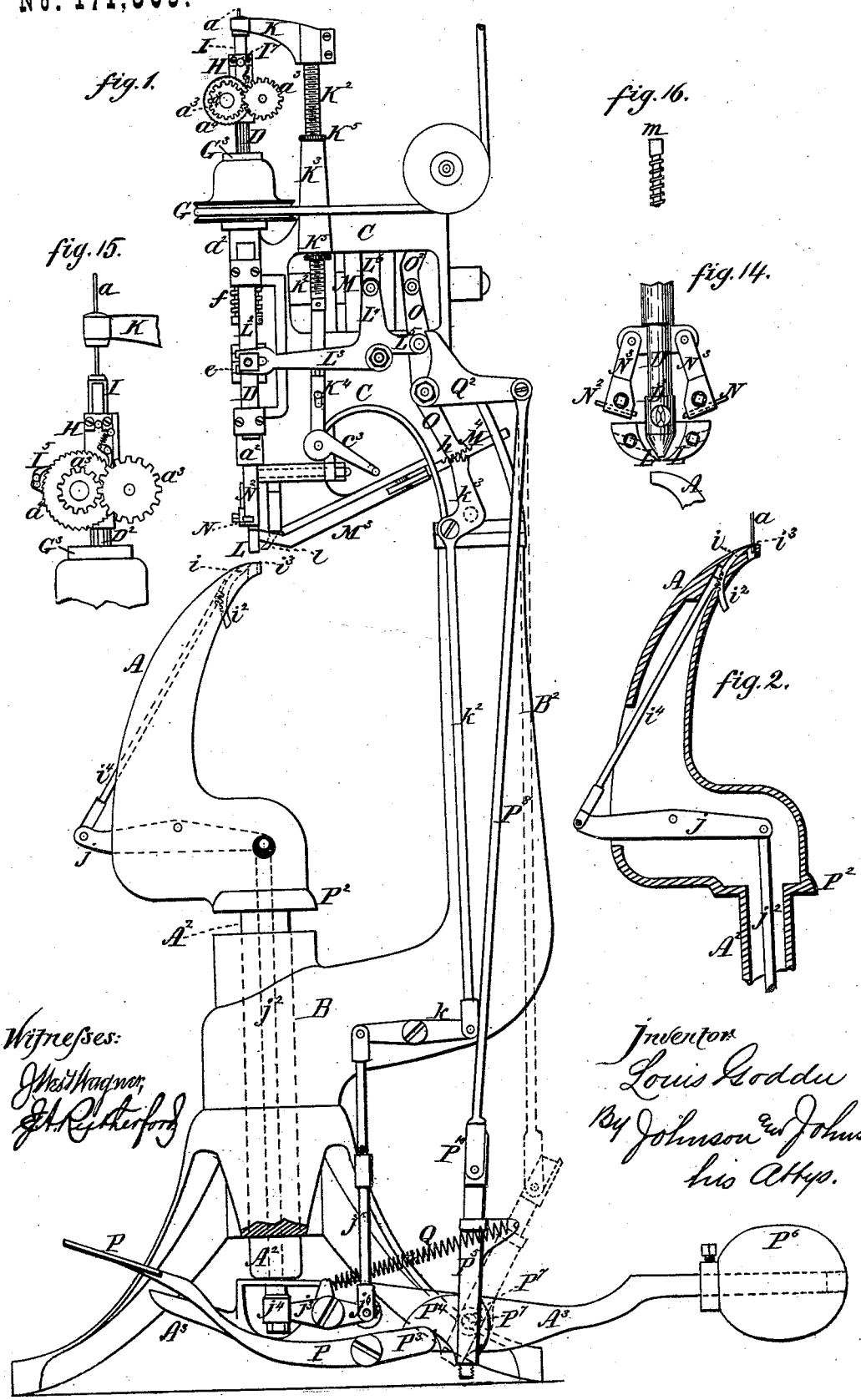

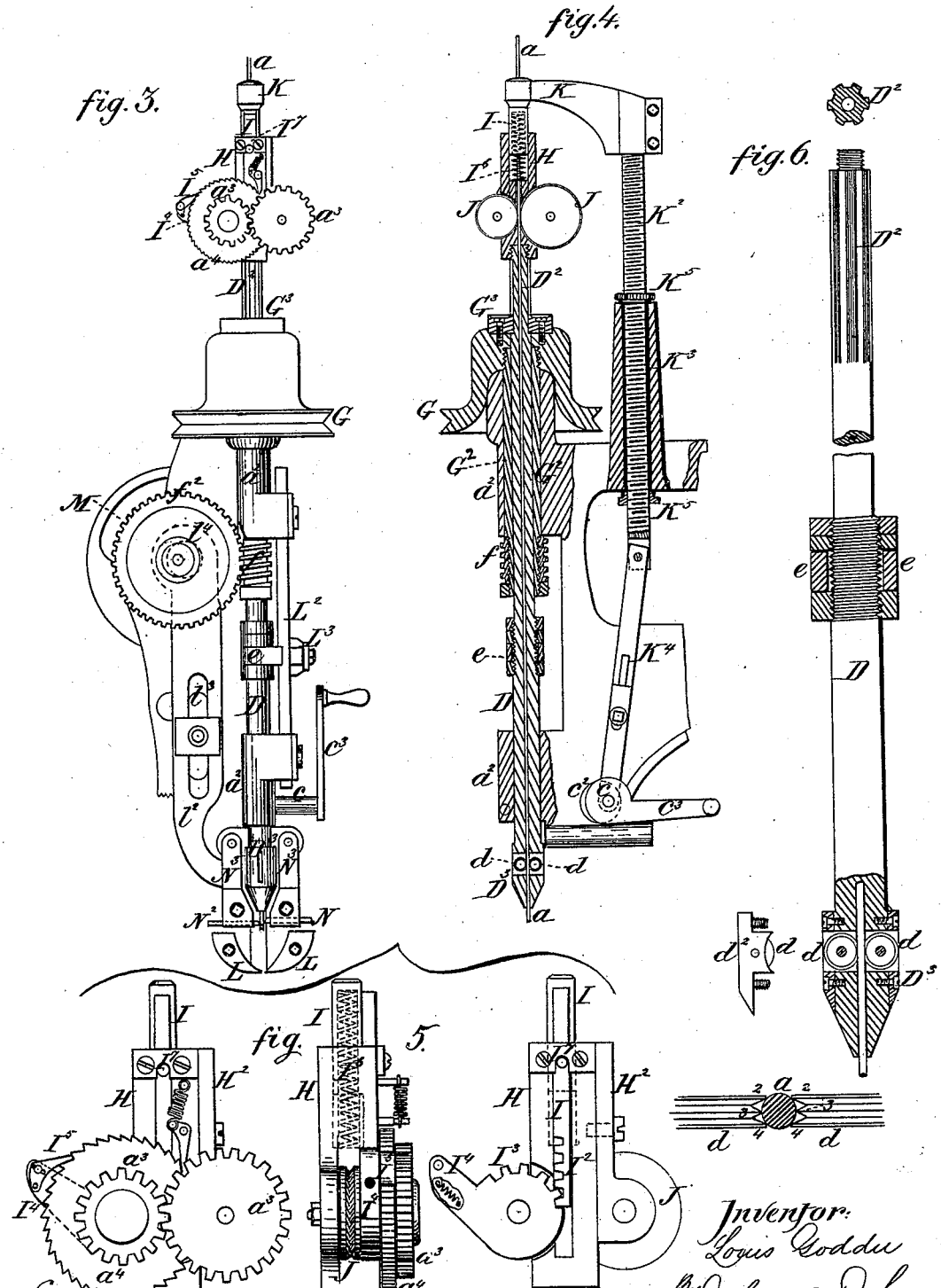
L. GODDU.
PEGGING-MACHINE.
No. 171,609. Patented Dec. 28, 1875.

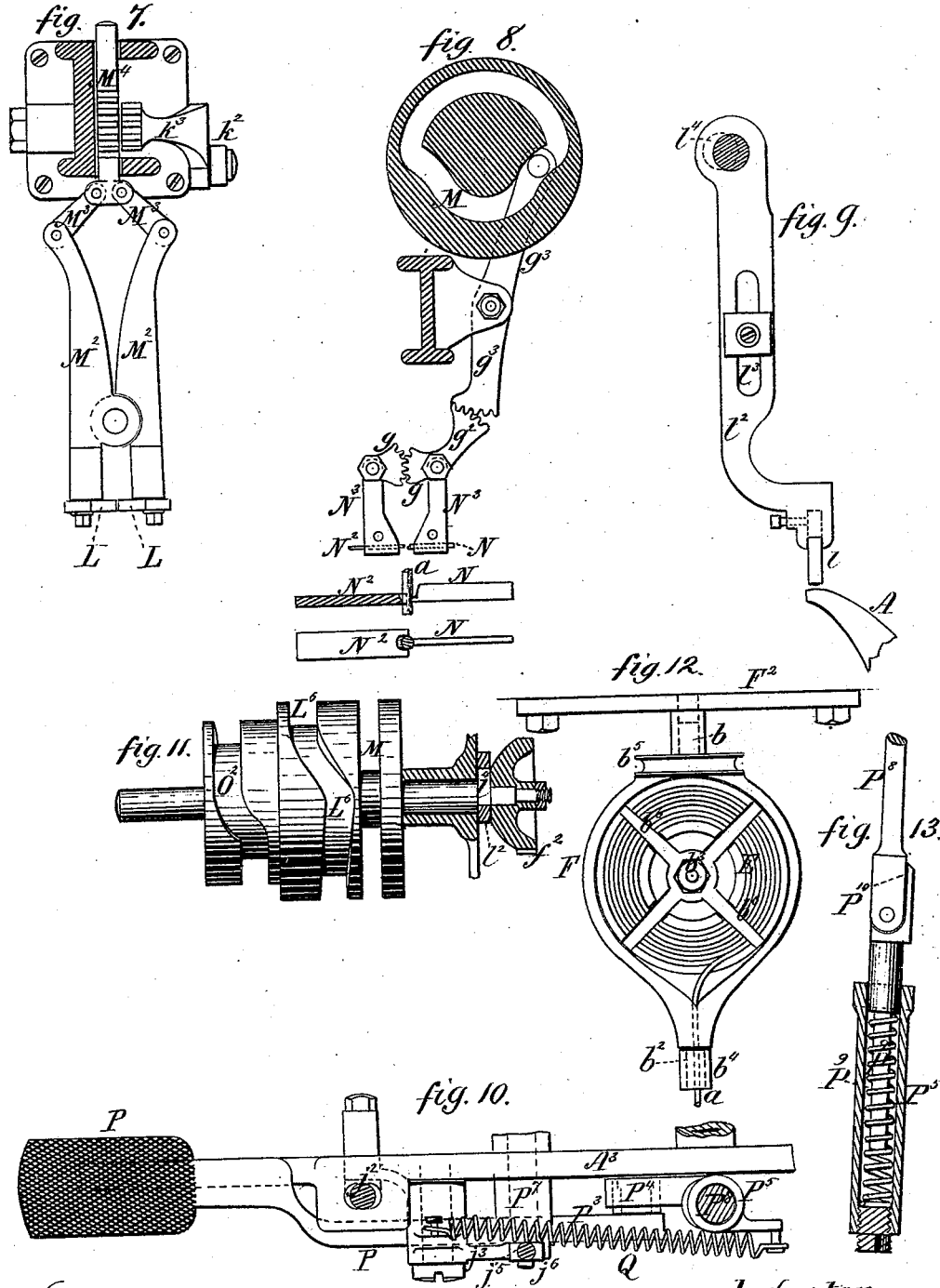

UNITED STATES PATENT OFFICE.

LOUIS GODDU, OF BOSTON, MASSACHUSETTS, ASSIGNOR TO THE AMERICAN CABLE SCREW WIRE COMPANY, OF SAME PLACE.

IMPROVEMENT IN PEGGING-MACHINES.

Specification forming part of Letters Patent No. 171,609, dated December 28, 1875; application filed November 22, 1875.

CASE A.

*To all whom it may concern:*

Be it known that I, LOUIS GODDU, of Boston, in the county of Suffolk and State of Massachusetts, have invented certain new and useful improvements in screw cutting and inserting machines for fastening the soles of boots and shoes; and I do hereby declare that the following is a full, clear, and exact description thereof, which will enable others skilled in the art to which it pertains to make and use the same, reference being had to the accompanying drawing, and to the letters of reference marked thereon, which form a part of this specification.

In machines of this kind hitherto constructed the screws have been cut in a continuous manner upon the wire, and while being so cut are screwed or entered into the work to unite the parts. In such method, however, the screws cannot have solid heads. It is one of the essential features of my invention to form the screws so that the thread of each shall terminate in a solid head by the severance of each screw from the wire at a point just above the termination of the thread, and after the screw has been entered into the parts to be united. The thread, however, is formed and completed previous to the operation of entering the screw. This overcomes the objections hitherto existing by the heating of the wire under the simultaneous operations of cutting the thread and inserting the screw.

In the organization of this machine the knives are so constructed and operated as to make the severance of the inserted screw close to the sole, thus saving the great waste resulting from the modes hitherto practiced. With a machine for forming and inserting solid-headed screws from a continuous length of wire, carried by an intermittently vertically-moving spindle, I have combined a cutter to operate within and at the supporting-surface of the horn or other support, the purpose of which is to cut off the surplus length of the screw which projects through the inner sole and into an opening in the horn, thereby leaving the surface of the inner sole perfectly free from projecting screws. The action of the horn-cutter is simultaneous with that of the knives which sever the screws from the wire; and the action of both must necessarily precede the feed of the work upon the horn. The alternate grasping and releasing of the wire in the spindle to give it a revolving motion to cut the thread and screw it into the work is a serious objection which my machine entirely remedies, in this, that the wire is held and made to turn with the spindle during the entire operation of the machine, making the turning of the wire certain at all times and without cutting into its surface, besides greatly simplifying the construction and operation of the machine in the devices by which these results are accomplished.

In combination with the device for giving the wire its rotary motion and at the same time allowing the wire to move in the direction of its length I employ a feeding device of peculiar construction for carrying the wire down to form successive screws, while the function of the device for turning the wire remains in full force—that is to say, it is not relaxed. This feeding device consists, primarily, of a vertically-movable section of the wire-carrying spindle and fulfills its function by the employment of a stop mounted upon the head, and having the capacity of varying and determining the feed of the wire to form and cut different lengths of screws.

In connection with the vertical adjustment of the horn I employ a compound weighted treadle, upon which the horn rests, and is provided with a knee-joint with a spring-connection, with an operating cam, whereby I obtain a cushioned auxiliary support for the horn which may be flexed when it is desired to lower the horn to place or remove the work. The wire is fed to the spindle from a spool having a compound motion to unreel the wire and turn in harmony with the spindle, to which it is always griped.

In the accompanying drawings, Figure 1 represents an elevation of the right side of a screw cutting and inserting machine for fastening the soles and uppers of boots and shoes, embracing my invention, the spindle being raised; Fig. 2, a vertical central section through the horn and its interior cutter; Fig. 3, an enlarged front view of the head, showing the feeding, chasing, and severing device with the spindle at the limit of its ascent, the wire fed and extending through the nose of the spindle the proper length for the screw, the chasers closed and in position to cut the thread as the wire is fed down, and the knives for severing the screw; Fig. 4, a vertical section of the wire-carrying spindle and its devices, together with the adjustable stop for varying and determining the feed of the wire; Fig. 5, enlarged sectional views, in different positions, of the feeding device; Fig. 6, an enlarged sectional view of the spindle detached, showing the griping-rolls, and the manner in which they bear upon and cause the wire to turn with the spindle; Fig. 7, a horizontal sectional view of the head, showing the severing-knives and their toggle-connection; Fig. 8, a sectional elevation, showing the means for operating the chasers; Fig. 9, the work-feed device, showing its relation to the horn; Fig. 10, a horizontal sectional view, showing the compound treadle; Fig. 11, a view of the nest of cams; Fig. 12, the pivoted wire spool-frame and its holder; Fig. 13, the knee-joint and its spring; Fig. 14, a view showing the spindle, screw-chasers, and severing-knives open, and the spindle at its lowest descent, while Fig. 15 shows the wire-feed device in its lowest position with respect to the stop-gage.

The revolving work-supporting horn and its treadle-connections are mounted in a base, B, and the head C, which carries the screw cutting and inserting mechanism, is secured upon the base-standard $B^2$, so that the wire-carrying spindle D will operate in line with the axis of the horn and its work-supporting nose. The spindle is hollow, and forms the guide for the wire from which the screws are made. As the wire is fed from a spool, E, Fig. 12, above, and as it is griped to and is turned constantly with the same speed of the spindle, it is necessary that the spool should turn in harmony with the wire $a$, and for this purpose the spool is supported in a skeleton frame, F, by vertical pivot-bearings $b$ $b^2$, in a bracket-frame, $F^2$, screwed to the ceiling. The spool turns upon a horizontal bearing, $b^3$, and the lower pivot-bearing $b^2$ forms, with the pivot-socket $b^4$ of the bracket-frame, the guide for the wire in a line coincident with the spindle. The spool-frame is revolved by a belt passing round a pulley, $b^5$, at the upper pivot-bearing $b$. One side of the spool is formed by a removable spider or disk, $b^6$, to allow the coil to be slipped on the spool, and the spider or disk is secured by a nut, the opposite end of the bearing having a spiral spring to give the required tension to the spool. The advantage of having the wire supported a distance above the machine is that it relieves the weight of metal which has to be revolved from resting on the machine, and avoids thereby the friction which such weight would cause and the danger of breaking the head. The spool, however, in revolving to unwind the wire, at the same time turns upon its pivots $b$ $b^2$ to prevent the wire from being twisted off by the rapid revolution of the spindle which carries the wire. The spindle D is revolved and moved up and down in guide-bearings $a^2$ on the head, its revolving motion being continuous and effected by a pulley, G, near its upper end, while its vertical movement is intermittent and variable as regards speed.

The driving-pulley G is secured to the upper end of a sleeve, $G^2$, Fig. 4, which passes through an extension, $a^2$, of the head, and through which sleeve $G^2$ the spindle rises and falls while being revolved. On the upper side of the pulley G a cap, $G^3$, is screwed, having an opening corresponding with the ribbed end $D^2$, Fig. 6, of the spindle D, whereby the latter receives its rotary motion while being made to rise and fall. The spindle is ribbed as far as needed to allow of the full vertical movement of the spindle to insert the screw and feed down the wire. The device for feeding the wire is mounted upon the upper end of the spindle, being screwed thereon, and consisting of a short holder, H, Fig. 5, for the feed-rolls, and having an opening in line with that of the spindle. A yielding extension, I, Fig. 5, is fitted in the upper end of this holder, and has a central opening, Fig. 4, through which the wire passes. A rack, $I^2$, Fig. 5, is formed on the side of this extension I, and meshes into a cogged segment, $I^3$, which has an arm, $I^4$, carrying a feed-pawl, $I^5$, held in place by a spring. The feed-rolls J J, Fig. 4, are mounted on bearings, so that the wire passes between their grooved corrugated circumferences, and which bear with sufficient pressure to prevent the wire from slipping. One of these feed-rolls has its bearings in a plate, $H^2$, Fig. 5, which may be tightened to give more or less pressure of the roll upon the wire to compensate for any difference in the size of the wire, and to take out any slight bends. On the axis of each feed-roll is a gear, $a^3$, meshing into each other; and on the axis of one of these feed-rolls is a ratchet-wheel, $a^4$, upon which the pawl $I^5$ of the segment-arm $I^4$ acts, when moved by the action of the rack in its descent. The normal position of the yielding extension I is its highest point, and is caused by a spiral spring, $I^6$, Figs. 4 and 5, one end resting upon a shoulder in the feed-roll holder H, and the other bearing upward against the yielding extension. This normal position is determined by a pin, $I^7$, Fig. 5, which is arrested by a cross-plate on the face of the holder. The feed-roll ratchet-wheel $a^4$ has the safety-pawl $I^5$ to prevent any retrograde movement of the feed-rolls caused by the act of entering and severing the screw.

From the foregoing it is plain that the descent of the spindle-extension I must carry the wire $a$ down by the turning of the feed-rolls J, but the extension I rises without giving them motion, by reason of the segment-arm $J^4$ being loose on the feed-roll axis.

The means for operating this feed device consists of a stop-gage, K, mounted upon the end of a rod, $K^2$, to bring its socketed end in line with the center of the spindle. This rod moves through a guide, $K^3$, upon the head C, and is connected at its lower end to a pin, $c$, on the end of an eccentric hub, $c^2$, Fig. 4, fitted in a bearing in the head. A crank-handle, $c^3$, on the eccentric pin $c$ serves as the means for raising and lowering the stop-gage K, in order thereby to determine the length of the screw. The gage-rod $K^2$ has an extension-joint section, $K^4$, Fig. 4, for increasing and diminishing its length by means of a set-screw working through a slot in the lapped ends of the extension-rod section $K^4$, which are held in line by a groove and rib. The gage stop-rod $K^2$ has a screw-thread upon it to receive milled nuts $K^5$, the positions of which are just above and below the rod-guide $K^3$, and is used by the operator to determine the exact height of the stop-gage. Now, as the length of the screw is determined by the extent of the downward movement of the spindle-extension I, and which is caused by the ascent of the spindle, bringing the extension in contact with the gage-stop, it will be seen that the relative height of the stop-gage, with respect to the head of the machine, will determine the descent of such extension I, and thereby feed wire enough for a longer or shorter screw, and this may be done quite readily by the operator turning the eccentric crank $c^3$.

The lower end of the spindle has an enlargement, $D^3$, to receive and hold within its circumference a set of small rolls, $d\ d$, for griping the wire, to hold it and to cause it to turn with the spindle. They are of peculiar circumferential construction, each being provided with two or more (three being shown) annular fins or griping-edges, 2 3 4, (shown in detail at the foot of Fig. 6,) each having a bearing upon the wire, which passes between them, the intermediate griping-edge being of a slightly less diameter than the two outer ones, in order that each roll may have several bearings upon the opposite sides of the wire. These seizing and holding rolls are arranged with the edges in line with the wire-passage, and form an opening about the size of the wire; and they are supported by boxes $d^2$, set in slots cut in the spindle-head, so that they may be adjusted by set-screws to give more or less pressure, and to accommodate different sizes of wire. The head $D^3$ of the spindle is cone-shaped at the point, to allow it to come down and enter between the severing-knives L, which clip the wire quite near the point of the spindle-nose. The vertical movement of the spindle is effected by a loose collar, $e$, through which the spindle passes, and is held in place by two nuts screwed upon the spindle above and below the collar, which collar $e$ has a fixed connection with a slide, $L^2$, moving in ways on the head. This slide is connected with the forked end of a lever, $L^3$, by means of slide-block connection, through which a screw passes into the collar to clamp the slide thereto. This lever $L^3$ is pivoted to the side of the head, and has a short branch, $L^4$, rising up and entering, by a roller, a grooved cam, $L^6$, on the cam-shaft. This grooved cam $L^6$, Fig. 11, is of such form as to give the proper vertical movement to the spindle, and which does not vary for the different lengths of screws. This cam-shaft is horizontal, and, being mounted in bearings in the head, carries all the cams for operating the different devices. Its motion is obtained from that of the spindle by means of a worm-gear, $f$, on the lower end of the driving-pulley sleeve $G^2$, which meshes into a gear, $f^2$, on the end of the cam-shaft. The screw-chaser N and a wire-support, $N^2$, are shown in detail and enlarged at the foot of Fig. 8, and are carried at the lower ends of two vertical arms, $N^3$, arranged to open and close just above the arms which carry the severing-knives L, and the bearings of these arms are horizontally formed in the head. (See Figs. 3 and 14.) One of these arms $N^3$ carries, in a horizontal position near its lower end, the support and guide $N^2$ for the wire while under the action of the chaser; and it is made adjustable in a slot and held in place by a clamp-plate and screw, the guide and support being formed in its inner end by a half-circle opening, Fig. 8, into and through which the wire passes, holding it in straight line with the spindle. This half-circle opening flares a little at the top, to allow the wire to enter readily, while the lower edge of the support is about equal to the half diameter of the wire.

The chaser N is held in the other arm in the same manner as the guide-support and in line therewith, so as to bring the chasing-point opposite the point of support, and it has a cutting-edge of any desired construction. A chaser may be held by each arm, if desired.

The cutter-bearing arms are L-shaped, and extend slightly beyond their bearings, and are connected by cogged segments $g\ g$, Fig. 8.

The arms carrying the chaser N are also connected by a cogged segment, $g^2$, with a lever, $g^3$, one end of which is also cogged, its other end being connected by a pin and roller with a face-groove cam, M, the form of which is such as to produce the proper opening and closing movement to the chaser and the wire support, and the cogged segment connections are set to produce equal and simultaneous movements of the arm.

Below the chaser-arms, the knives L, for severing the wire, are arranged to operate, and are mounted on the ends of shear-levers $M^2$, Fig. 7, pivoted to the under side of the head, These knives open and close by the movement of the levers, at proper intervals, to sever the wire from the screw after being entered, and just below the nose of the spindle when at its lowest descent, and which is flush with the surface of the stock, whereby a great saving of wire is effected, as well as labor in removing the projections and finishing the surface of the work. The knives L L are made detachable, of any desired construction, and may be easily replaced when broken, and removed to be sharpened, being secured by clamp-screws. In the example shown these knives are crescent-shaped, and have a braced connection with their arms, formed by a rib which enters a groove on the ends of the arms, and makes the knives quite solid with the arms, so that they cannot possibly give while cutting the wire. The arms carrying the knives are operated by means of a toggle-joint connection, $M^3$, having a cogged slide, $M^4$, fitted in bearings in the head. This cogged slide $M^4$ meshes into the cogged segment $h$, Fig. 1, of a lever, O, pivoted to the head, and with its other end connecting with the cam $O^2$, which gives it motion. The cam $O^2$ is of such form as to cause the knives to operate at proper intervals. The flexing movement of the toggle-arms $M^3$ opens the knives L, and their straightening action closes the knives.

The horn has its work-supporting nose in line with the wire passage, and is mounted by a stem, $A^2$, passing through an opening in the standard B, and by which it is allowed to have a vertical adjustment, which is rendered automatic by its connection with a pivoted weighted treadle, $A^3$, and an auxiliary treadle, P, pivoted to the main treadle. In this automatic adjustment of the horn, the head C remains fixed, while the horn adapts itself to the varying thicknesses of the material to be united, and, in this particular, is essentially different from machines of this class hitherto in use. A shoulder, $P^2$, on the horn-stem $A^2$, in connection with a bearing on the standard B, determines the limit of the descent of the horn. The stem $A^2$ of the horn rests upon a pivoted weighted treadle, $A^3$, and the weight thereof is sufficient to maintain the horn in its normal position, which is against the knives, when there is no work on the horn, and can be adjusted to give more or less upward pressure. Pivoted to the main treadle $A^3$ is a secondary treadle, P, the short arm $P^3$ of which operates in connection with an arm, $P^4$, of a socket, $P^5$, also pivoted to the main treadle between the weight $P^6$ and fulcrum $P^7$ of the main treadle, Figs. 1, 10, and 13. This pivoted socket $P^5$ holds a rod, $P^8$, resting on a spiral spring, $P^9$, and which has a knee-joint, $P^{10}$, which is kept in line by a spiral spring, Q, the tension of which brings the knee-joint $P^{10}$ straight.

The upper end of this rod $P^8$ connects with one arm of an elbow, $Q^2$, Fig. 1, pivoted to the head, and having its other arm operated upon by a branch, $L^5$, from the spindle-operating lever $L^3$. The object of this construction is to force and hold the horn against the stock with sufficient force to resist the downward pressure of the spindle while inserting the screw. It is necessary to give this increased pressure at the insertion of each screw, in order to prevent the horn from receding, and it is also necessary to relax this pressure just before the feed-foot operates, the action of which must depress the horn slightly, so that the work may be moved along on the horn. Were it not for thus releasing the pressure of the work-support automatically the feed-foot would mar the surface of the work. This pressure is effected at the proper moment by the descent of the spindle, causing its lever-connection with the pivoted elbow $Q^2$ to force down the rod $P^8$, compressing the spring $P^9$, and by this means making an auxiliary weight to the treadle, while the relaxing of this pressure is caused by the upward motion of the spindle, which releases its lever action upon the elbow $Q^2$, and allows the knee-jointed rod $P^8$ to rise in its socket $P^5$, and thereby diminish the pressure on the spring $P^9$, which rests upon a nut screwed in the lower end of the socket, Fig. 13, and can be adjusted to give more or less force to the spring.

To place or remove the work from its support, it is necessary that the latter should have considerable vertical movement from the fixed head, and which causes a corresponding elevation of the weighted end of the treadle. Now, if the knee-joint $P^{10}$ maintained its normal position during this elevation of the weighted end of the treadle it would cause too violent a compression of the spring, and to remedy this the knee-joint is flexed by turning the socket $P^5$ upon its pivot $P^7$ by the ascent of the short end $P^3$ of the auxiliary treadle P. When the auxiliary treadle is depressed by the foot of the operator sufficient to produce this flexure it comes in contact with the main treadle $A^3$, on which the horn rests, when both treadles continue their descent, until the horn or other support is sufficiently lowered. By this means the work is quickly removed and put in place, and when so placed the horn adjusts itself automatically to the different thicknesses of work, and in changing from the ball to the shank of the sole. Combined with the horn, and entirely independent of its rotary or vertical movement, is a cutter, $i$, Fig. 2, arranged to operate flush with its supporting-surface, for the purpose of cutting off the end of each screw even with the surface of the inner sole. This cutter $i$ is formed at the point of a segmental shank, $i^2$, having a cogged rack on its convex edge, and is fitted to slide in a groove within the horn, so as to bring its cutting-edge against a steel or hardened face, which forms one side of a wire-receiving passage, $i^3$, and which passes through the horn to form an outlet for the clippings. This cutter $i$ is operated by a rod, $i^4$, cogged to mesh into the cogged edge of the cutter-shank, and arranged to work in a groove in the horn, and is connected at its lower end by a lever, $j$, which is pivoted within the horn, and connected at its inner end to the upper end of a rod, $j^2$, running through a central opening in the horn-stem $A^2$, the lower end of which rod $j^2$ passes through an opening in the main treadle $A^3$, and is connected to one arm of a lever, $j^3$, by means of a swivel-joint, $j^4$, to allow of the rotary motion of the horn. This lever $j^3$ is pivoted to the main treadle, and its other arm is connected to a vertical rod, $j^5$, having a screw-sleeve to connect its two parts by right and left threads to lengthen or shorten the said rod, and the connection of said lever with this rod is made by a pin, $j^6$, coincident with the treadle-pivot $P^7$.

These two arms of the lever $j^3$ are of equal length, and it will be seen that by this construction the movements of the treadle will not impart the least movement to the levers working the horn-cutter, because, whatever position the treadle may be in, the pin $j^6$, connecting the vertical rod, and the pivot $P^7$ of the treadle, will remain coincident. This vertical rod $j^5$ is connected at its upper end to one end of a horizontal bar, $k$, pivoted to the standard, the other end of which bar is connected with a vertical rod, $k^2$, whose upper end is united to one arm of an elbow, $k^3$, pivoted at the head of the standard, and having its upper arm cogged and meshing into the same lever O that operates the toggle-joint which gives motion to the wire-severing knives. By this construction and arrangement I obtain a simultaneous action of the knives which sever the screw from the wire and cut off the end of the screw projecting through the surface of the inner sole, and which harmony of action is necessary to the rapid working of the machine.

At the moment the screw is cut from the wire the work is fed along a proper distance to receive another screw, and this is effected by the following means: A feed-foot, $l$, Fig. 9, of suitable shape, is fitted in a socket in the end of a bar, $l^2$, having a slot, $l^3$, within which is a block which forms an adjustable fulcrum to regulate the length of feed by increasing or diminishing the vibration of the bar. The upper end of this bar $l^2$ is connected with an eccentric, $l^4$, on the cam-shaft from which the feed-foot $l$ receives its proper motion. The feed-foot is located just in the rear of the wire-severing knives L, and in position to operate on the stock just over the work-support.

I have given a specific description of the several operating devices of the machine, but as my invention comprehends a broader principle than mere construction, I do not therefore wish to be confined to the specific details described, but to vary the same so long as the essential combinations and results described are obtained.

In operating the machine the horn is depressed by the treadle $A^3$, and the work placed on it, when, by releasing the treadle, the horn rises, bringing the work against the knives L, which sever the wire, the wire $a$ having been previously inserted and fed down through the spindle D, and griped to cause it to turn with it. We now assume the spindle to be at its highest point of elevation, as shown in Fig. 3, with wire enough to form one screw projecting below it, and power applied to the machine. The screw-chaser N and the wire-support $N^2$ are brought in position to cut the thread, which is caused by the rotary motion of the spindle, which is continuous in one direction; meanwhile the spindle is caused to descend with a speed equal to the number of threads to the inch, until length enough for one screw is formed, when the arms $N^3$, carrying the chasing device, open quickly to give room for the spindle to move down rapidly, until it reaches the work. At this point the descent of the spindle is the same as when cutting the thread. The rotary and vertical motions of the spindle continue until the full length of the screw is entered and a little of the unthreaded wire is carried into the sole, when the knives L are caused to act, severing the screw with the solid head $m$, Fig. 16, from the main length flush with the surface of the sole. During this operation the spool E, from which the wire is fed, revolves with the spindle.

In order that every screw shall have a perfect hold on the inner sole, a length of wire slightly exceeding in length the thickness of the sole is fed. This surplus length passes through the inner sole, and into the opening in the nose of the horn, when it is clipped off by the cutter $i$ close to the surface of the sole, leaving the shoe perfectly smooth inside. At this point the pressure on the auxiliary treadle P is released, and the feed takes place at the same time the spindle is rising in which the wire is firmly griped. Previous, however, to the spindle reaching its highest point of ascent, the yielding extension I, having been put in its normal position by the spiral spring $I^6$ in its holder, strikes the stop-gage K, which has been set at the required point, and stops the extension. The spindle, still continuing its ascent, forces the yielding extension I downward, operating the feed-rolls J J, and carry down through the griping-rolls $d$ $d$ wire enough for another screw, the length of such screw depending upon the adjustment of the stop-gage K, as the sooner the yielding extension I strikes the stop-gage K the longer will be the screw, and vice versa. The several cams are so formed and operate as to time each device, and to effect the co-operation of the several parts to produce the results stated.

It must be observed that a very marked advantage results from the operation of inserting a screw formed upon and cut from a continuous length of plain wire, in having the head solid and of the full diameter of the wire, as such feature gives much greater beauty of finish, and, besides the head, being larger than the body of the wire, is more firmly held in its place, and prevented from working in, and in this respect is different from any other known screw-inserting machine, while the clean clipping of the inner end of the screw makes a much smoother bottom than can be obtained by the usual imperfect method of clinching or riveting.

An essential novelty of this machine also lies in the great advantage of an automatic and unintermittent griping device for the wire, and allows the griping device to travel freely over the wire while feeding, while the function of the griping device remains intact, and this feature distinguishes this machine from all others.

Another highly-important advantage consists in imparting to the spindle an intermittent vertical movement, whereby the wire is first threaded in plain sight of the operator, and then inserted. This avoids the heating of the wire by subjecting it to only one operation at a time, and enables the operator to see if the chasing-tool is doing its work properly, and to stop the machine before an imperfect screw is inserted. In these respects, also, this machine is of wholly novel construction.

Although I have described the machine as adapted for the manufacture of boots and shoes, yet it is obvious that it can be used to advantage in uniting the seams of hose, belting, and other similar work, and the work may be supported upon an adjustable jack, such as is used in wood-pegging machines, as my invention is not all dependent upon the employment, or combination therewith, of a rotating work-supporting horn.

In this case, however, the interior cutter and its operating devices are not used, and I rely on the stop-gage for inserting the proper length of screw. Thus I obviate all necessity of cutting the wire inside. The machine is also equally well adapted for inserting screws without solid heads. In such case, however, the wire-severing knives must be made to work quicker to sever the wire before it is screwed below the threaded part. This is done by altering the time of the cams.

What is claimed in this invention for uniting the soles and uppers of boots and shoes is—

1. The combination of an intermittent vertically - moving wire - carrying spindle, and mechanism with which it co-operates to cut and insert screws with solid heads from a continuous length of wire, for uniting the soles to the uppers of boots and shoes, with a rotating work-supporting horn, or other support, substantially as herein set forth.

2. In an organized machine, the combination of mechanism which cuts and inserts screws with solid heads from a continuous length of wire, for uniting the soles of boots and shoes, with an automatic vertically-adjusting work-supporting horn or work-support, substantially as herein set forth.

3. The combination of mechanism in a machine which cuts and inserts screws from a continuous length of wire with solid heads, for uniting the soles to the uppers of boots and shoes, with a rotating work-supporting horn, having an automatically-operating interior cutter for clipping off the inner ends of the inserted screws.

4. The combination of an automatically vertically-adjusting work-support, with an interior cutter operating automatically to clip the inner ends of the screws at whatever height or position the support may be with respect to the head, substantially as herein set forth.

5. The combination of a revolving wire-carrying spindle, D, with a continuously griping and holding device for the wire carried thereby, and an automatically-adjustable work-support, substantially as herein set forth.

6. A continuously griping and holding device for turning the wire while cutting the thread and inserting the screw, consisting of rolls $d$ $d$, having annular seizing-edges, in combination with a continuously-revolving wire-carrying spindle, D, whereby the wire, while being griped, is free to be moved in the direction of its length, substantially as herein set forth.

7. The combination, with a revolving wire-carrying spindle, provided with a continuously griping and holding device for the wire, near the end of said spindle, of an enlarged head and cone point forming the end of the spindle, whereby the wire is griped near the screw, and supported to prevent it being twisted off while being inserted, substantially as herein set forth.

8. The combination, with a work-support, of a wire-carrying spindle, having an automatic revolving and vertical movement, and a feeding device, of mechanism for determining the length of the screw by the ascent of the spindle, substantially as herein set forth.

9. The combination, with a work-support and a revolving wire-carrying spindle, provided with a feeding device, of a yielding wire-passage extension, I, of the spindle D, and a stop-gage, K, with which it co-operates to effect the feed of the wire, substantially as herein set forth.

10. The combination, with a rotating work-supporting horn, and a revolving wire-carrying spindle, provided with a yielding extension, I, for operating the feed device, of an adjustable stop-gage, K, whereby screws of different lengths, without arresting the movement of the machine, may be inserted in the work, substantially as herein set forth.

11. The combination, with a wire-carrying spindle having both a rotating and vertical movement, and carrying the wire griping and holding device at its lower end, of a feed device at its upper end, consisting of a yielding wire-passage extension I, working by cogconnection I², and pawl-lever I⁴, and feed-rolls $d\ d$, operated thereby, whereby the wire is fed by the descent of such cogged extension, and left unaffected by its ascent, substantially as herein set forth.

12. The combination, with a revolving wire-carrying spindle, its feeding and griping devices for cutting and inserting varying lengths of screws from a continuous length of wire, of automatically opening and closing arms N³, carrying the screw-chaser N, and a wire support, substantially in the manner herein set forth.

13. The combination, with a revolving work-supporting horn and a wire-carrying spindle having both a revolving and vertical movement, of screw-chasing and wire-supporting devices, and the automatically-operating wire-severing knives L, co-operating to form and insert the screw, and cut it from the main length, substantially as herein set forth.

14. In a machine for cutting and inserting solid-headed screws from a continuous length of wire, the combination, with mechanism for effecting these results, of a work-feeding device, and an automatically vertically-adjustable and work support, substantially as herein set forth.

15. The method of forming and inserting solid-headed screws cut from a continuous length of wire by the intermittent vertical motion of the wire-carrying spindle and the co-operation therewith of intermittently chasing and severing devices, whereby the wire is fed forward at proper intervals, a screw-thread cut of proper length, a head formed, and the screw severed and inserted into the stock, substantially as herein set forth.

16. The process of uniting the uppers to the soles of boots and shoes by means of solid-headed screws automatically formed, cut and inserted successively from a continuous length of wire, substantially as described.

17. The combination, in a machine for uniting the uppers to the soles of boots and shoes, of mechanism adapted to form solid-headed screws, cut from a continuous length of wire, with knives L, which sever the inserted screw from the main length carried by the head, and a cutter for clipping the inner end thereof carried by the work-support, substantially as herein set forth.

18. The curved horn-cutter $i$, provided with cogs, in combination with the cogged connection $i^4$, the pivoted arm $j$, the central rod $j^2$, and the device for operating the severing-knives L, with which the central rod is connected, and co-operates with mechanism for cutting and inserting screws with solid heads cut from a continuous length of wire, substantially as herein set forth.

19. The combination, with the treadle A³, for supporting the rotating horn, of an auxiliary treadle, P, pivoted to the main treadle, and a knee-joint connection, P¹⁰, with mechanism for increasing the upward pressure of the horn.

20. The combination, with the rotating work-supporting horn, and the cutter carried thereby, of the connected pivoted arm $j^3$, having its pivot-connection $j^6$, with the cutter-operating devices coincident with the pivot P⁷ of the main treadle A³, whereby the action of the horn-cutter is kept wholly independent and unaffected by the vertical movement of the horn.

21. The combination, with the auxiliary treadle P, pivoted to the main treadle A³, as described, of the pivoted socket-arm P⁵, containing the spring-cushion P⁹ and the flexing knee-joint P¹⁰, operated by said treadle, whereby to effect the full descent of the horn.

22. In a machine for uniting the uppers to the soles of boots and shoes from a continuous length of wire, the combination, with a spindle having a revolving and vertical movement, and carrying a wire-griping device, which has a continuous hold upon said wire, of a rotating work-supporting horn, having a nose-opening, $i^3$, in line with the inserted screw, and a cutter, $i$, to clip the screw end extending below the face of the horn-support.

23. The combination, in a machine for uniting the uppers to the soles of boots and shoes from a continuous length of wire fed through a spindle having an intermittent vertical movement, of a screw-chaser, N, and a wire-support, N², operated to close upon the wire, and be carried therefrom by simultaneous movements produced in the manner herein set forth.

24. In a machine for uniting the uppers to soles of boots and shoes from a continuous length of wire, the combination of a spindle having a revolving and vertical movement, and in which the wire is continuously griped to turn it therewith, with a spool, E, for the wire, revolving to unreel the wire, and turned with and in the direction of the spindle, whereby the wire is prevented from being twisted, although the spool is separated from the machine.

In testimony that I claim the foregoing I affix my signature in presence of two witnesses.

LOUIS GODDU.

Witnesses:
  A. W. ADAMS,
  N. S. HOTCHKISS.